United States Patent Office 2,939,014
Patented May 31, 1960

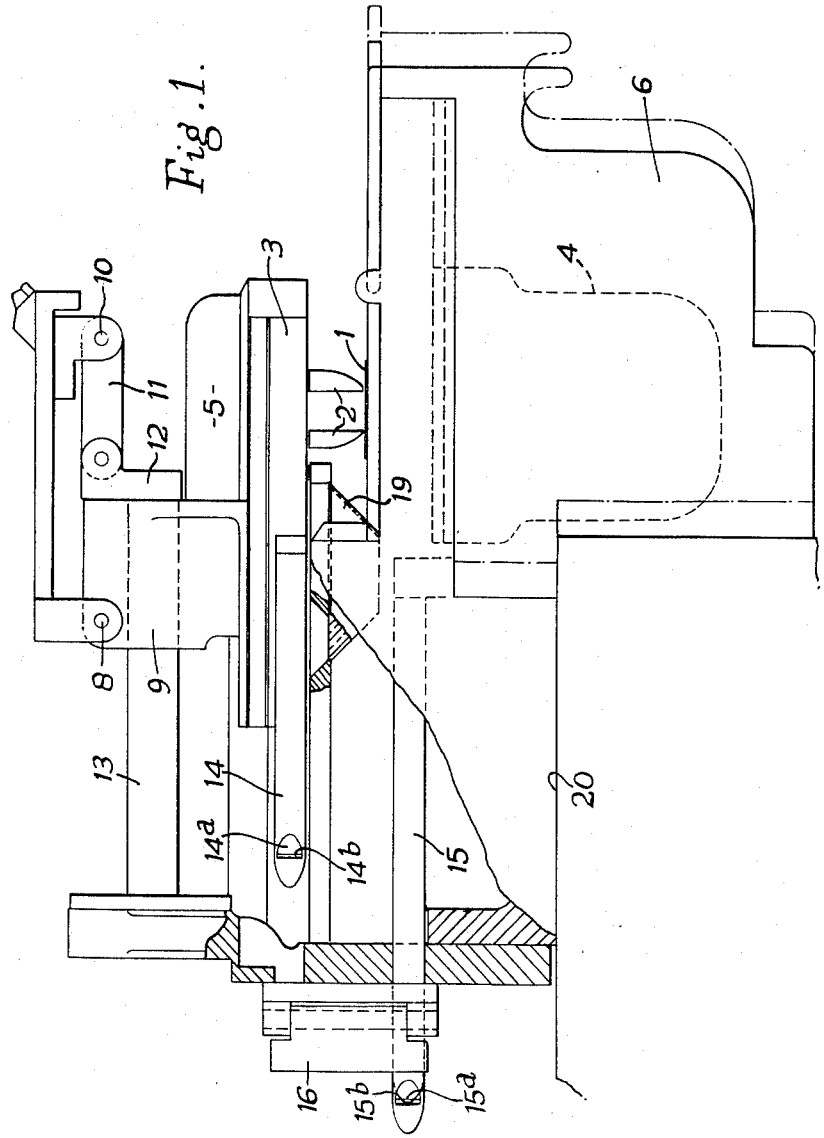

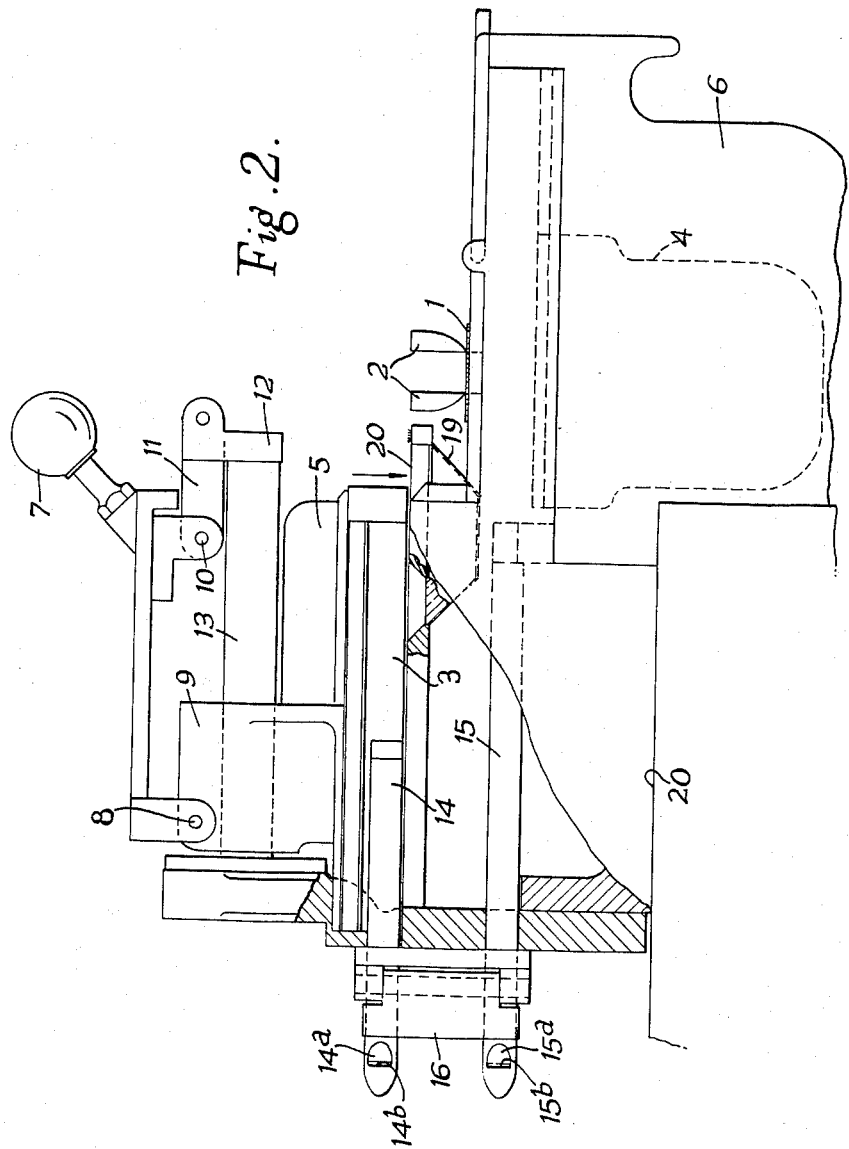

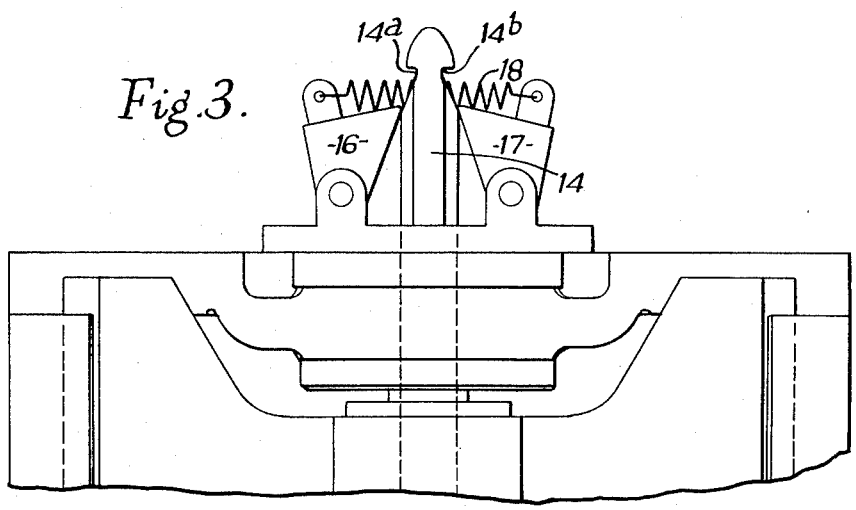
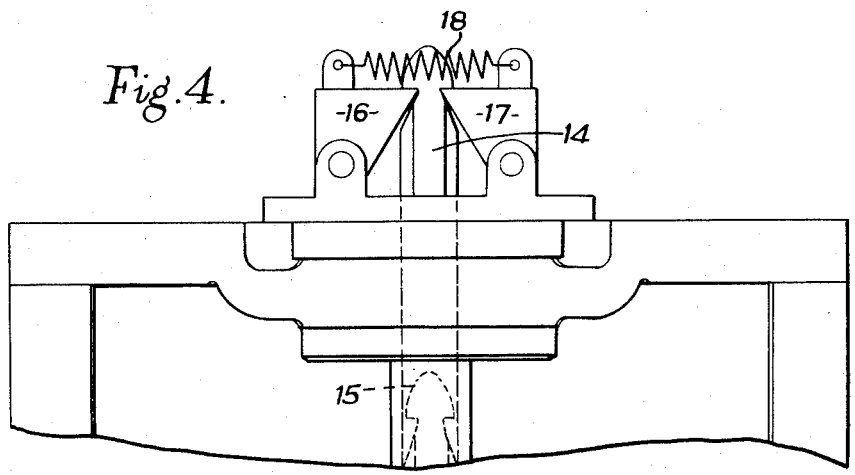

2,939,014

SAFETY DEVICES

Harry Williams, Deptford, London, England, assignor to Molins Machine Company Limited, London, England, a British company Filed July 10, 1956, Ser. No. 597,026

Claims priority, application Great Britain July 12, 1955

2 Claims. (Cl. 250—83.6)

This invention concerns improvements in or relating to safety devices for controlling or preventing movement of parts of an apparatus except in certain conditions.

One example of apparatus in which safety devices according to the invention can be used is measuring or detecting apparatus which employs a source of penetrative radiation (for example beta rays) whereby rays from the source pass through material whose mass is to be measured or determined and are received by a device, such as an ionisation chamber, which is responsive to the rays. Such apparatus can be used for measuring the mass of a stream of tobacco passing between the source and the ray-responsive devices. It is necessary to screen the source so as to prevent the risk that a machine attendant or other person might become exposed to radiation. While the measuring operation is in progress, the source is screened or shielded by the ray-responsive device, and when measuring is not taking place, the source is preferably moved bodily to a safe position in which it is adequately screened. If however it should become necessary to remove the ray-responsive means for any reason, it is important to ensure that the source should then be and remain in the "safe" position, since in its "operative" position it would at that time be unscreened and might be a danger to attendants or others.

According to the present invention there is provided, in apparatus comprising two movable parts each independently movable from a given position, a safety device comprising a catch adapted to prevent withdrawal of one of said parts from said position when the other said part has been withdrawn from said position, and to be held open by said other part, when the latter is in said position, so as to permit withdrawal of the said one part. Preferably each of said parts is arranged to be engaged by said catch so as to be held against withdrawal except when one of them is in said position.

Where the device is applied to apparatus as mentioned above, one of the said parts may comprise a source of radiation, while the other said part comprises the ray-responsive means. In that case, the said given position of the part comprising the source is the "safe" position referred to above, while the said given position of the part comprising the ray-responsive means is the normal position occupied by that part during operation of the measuring apparatus. Thus the part comprising the ray-responsive means cannot be withdrawn from that position unless the source is in the "safe" position, and conversely the part containing the source cannot be withdrawn from the "safe" position unless the ray-responsive means is in its normal operating position to screen the source.

The device may comprise bolts carried by said movable parts, each bolt being provided with a lateral recess that can be entered by a spring-urged catch member so as to prevent movement of the bolt in a direction such as to permit withdrawal of its associated part, the arrangement being such that when either of said parts is in its said given position, the bolt carried by said part prevents the catch from entering the recess in the other bolt, and thus permits withdrawal of the latter.

Apparatus according to the invention will now be described by way of example with reference to the accompanying drawings, in which:

Figure 1 is a side elevation of apparatus for measuring the mass of a tobacco stream, the parts being in operative position;

Figure 2 is a view similar to Figure 1, one of the parts being in the "safe" position;

Figure 3 is a plan of part of Figure 2; and

Figure 4 is a view similar to Figure 3, but showing the parts in a different position.

Referring to Figure 1, the apparatus shown is for use in a continuous rod cigarette-making machine, and is intended for measuring the mass of tobacco which is carried in a stream on a paper web 1 between side guides 2. The apparatus comprises a box 3 containing a ray source, and a casing 4 containing an ionisation chamber. When the parts are in the position shown in Figure 1, rays from the source pass through the tobacco on the paper 1 to the ionisation chamber, which effectively screens or shields the source and prevents any risk of the machine attendant being exposed to radiation.

The box 3 containing the source is mounted on a carrier 5 which is slidable horizontally to the inoperative position in which it is shown in Figure 2, in which position the source is suitably screened, in the example illustrated by the mass constituted by the machine frame 20. For convenience this will be referred to as the "safe" position.

The casing 4 of the ionisation chamber is mounted in a carrier 6 which normally remains in the position as shown in Figure 2 and as shown in full line in Figure 1. It is however sometimes necessary to remove this carrier bodily, for example to replace the ionisation chamber, or for inspection. For this purpose the carrier 6 can be slid bodily towards the right, as viewed in Figures 1 and 2, that is it is moved bodily as indicated by the chain line position which shows the beginning of the movement.

When this is done, however, it is important that the source should be in the "safe" position (i.e. that in which it is shown in Figure 2) and should remain there as long as the carrier 6 is missing, since otherwise the ray source would be unscreened. Accordingly a safety device is provided to ensure against inadvertent removal of the carrier 6 while the source is in its operative position, and also against inadvertent movement of the source from its "safe" position while the carrier 6 and ionisation chamber are missing.

Movement of the carrier 5 to move the ray source between its "safe" and its operative position is effected by means of a handle 7 pivotally connected at 8 to an extension 9 of the carrier 5, and also pivotally connected at 10 to one end of a link 11. The other end of the link is pivoted on a fixed part 12 which is connected to a slide 13 along which the extension 9 slides. The handle 7 can thus be moved to swing the link about its pivot and at the same time to slide the carrier 5 in one direction or the other. The extreme movement of the carrier in each direction is determined by the link 11, as can be seen from a comparison of Figures 1 and 2, and the link acts as a toggle to hold the carrier firmly in each position.

Fixed to the carriers 5 and 6 respectively are two bolts or pins 14 and 15, provided near their free ends with lateral recesses 14a and 15a. As seen in Figures 3 and 4, both sides of each of the bolts are recessed, and the recesses provide shoulders 14b and 15b. A pair of opposed pivoted catch members 16 and 17 are connected to each other by a spring 18 which urges the catch members towards each other so that they engage both sides of both the bolts 14 and 15 (assuming that both bolts are in position to be so engaged).

When the carrier 6 is in place and the carrier 5 is in the position shown in Figure 2 (i.e. the source is in the "safe" position) both of the bolts are at their extreme left-hand positions as viewed in Figure 2; and the catch members 16 and 17 press against the sides of both bolts a little to the rear of the recesses 14a and 15a. As can be seen from Figure 3, the width of a bolt behind the recess is greater than the width of the shoulders 14b and 15b; and so when the bolt 14 is in its extreme forward position, as shown in Figure 3, the bolt 15 can be withdrawn, because the bolt 14 holds the catch members apart and prevents them from entering the recesses 15a on the bolt 15. Conversely if the bolt 15 is in its extreme forward position it holds the catch members 16 and 17 away from the recesses 14a in the bolt 14. Thus one bolt can be withdrawn as long as the other remains in its extreme forward position. If one bolt has been withdrawn, however, and it is attempted to withdraw the remaining bolt, the catch members will enter the recesses of that bolt and by engaging the shoulders will prevent further withdrawal. This is illustrated in Figure 4, where the bolt 15 has been withdrawn, and the bolt 14 is prevented from withdrawing by the catches engaging the shoulders.

It will thus be seen that if the carrier 6 has been removed, and it is attempted to withdraw the carrier 5 from the "safe" position, the catch members 16 and 17 will enter the recesses 14a in the bolt 14 and prevent such withdrawal. Conversely if the carrier 5 is in the operative position as shown in Figure 1, withdrawal of the carrier 6 will be prevented by the catch members entering the recesses in the bolt 15.

To enable the ray-source to be inspected, a prism 19 is arranged in such a position that when the parts are in the position shown in Figure 2 (i.e. the source is in the "safe" position) an image of the source is internally reflected through the prism and can be observed by looking downwardly in the direction of the arrow on to that part 20 of the upper surface of the prism which is exposed (see Figure 2).

What I claim as my invention and desire to secure by Letters Patent is:

1. A safety device for a radio-active gauge having a carrier for a radio-active source, and a ray-responsive device, each movable away from a position where they cooperate and where the rays from the source are adequately screened by said ray-responsive device, comprising means for moving the carrier to another position and screening the rays during transit to and at said other position, a bolt attached to the carrier and a bolt attached to said ray-responsive device, each bolt having a ratch-like recess, a spring-urged pawl capable of entering one or both of said recesses and holding a bolt whose recess is entered by the pawl against movement in one direction, the bolt of the carrier being withdrawn from contact with the pawl when the carrier is in the first said position and contacting the pawl when the carrier is in the second said position, said pawl being then held against movement into either recess if a bolt is moved past the pawl, by engagement with the unrecessed surface of the other bolt, whereby the ray-responsive device cannot be moved away from the first position if the carrier is in the first position as the pawl will enter into stopping engagement with the recess in the bolt of the ray-responsive device, while if the carrier is in the second position the ray-responsive device can be withdrawn from the first position but the carrier cannot then be moved back into the first position as the pawl will enter into stopping engagement with the recess in the bolt of the carrier, while if it is attempted to move the carrier from the second said position and simultaneously move the device from the first said position the pawl will enter both recesses and check movement of both bolts.

2. Apparatus comprising two movable parts comprising respectively a radio-active source and a ray-responsive device, each being independently movable from a given position and having a safety device adapted to prevent withdrawal of either of said parts from said position when the other part has been withdrawn therefrom, the safety device comprising a pair of bolts, each bolt being formed as a rod carried by one of said movable parts and having a lateral recess therein, a catch common to both bolts and spring urged to tend to enter a recess to prevent movement of the corresponding bolt in one direction, the unrecessed portions of the rods being sufficiently large to hold the catch against movement into a recess when both movable parts are in the given position at which time said unrecessed portions are in engagement with the catch, whereby when either of said movable parts is in said given position, the bolt carried by said part prevents the catch from entering the recess in the other bolt and thus permits withdrawal of the associated movable part but on movement of one of said movable parts after the other movable part has been withdrawn the bolt of said one part slides through the catch until the recess reaches the catch and further bolt movement is prevented.

References Cited in the file of this patent
UNITED STATES PATENTS

| | | |
|---|---|---|
| 1,781,932 | Petersen | Nov. 18, 1930 |
| 2,704,079 | Molins et al. | Mar. 15, 1955 |
| 2,704,944 | Hughes et al. | Mar. 29, 1955 |
| 2,706,789 | Hughes | Apr. 19, 1955 |
| 2,716,902 | Skareen | Sept. 6, 1955 |